United States Patent
Gartland et al.

(10) Patent No.: US 6,682,620 B2
(45) Date of Patent: Jan. 27, 2004

(54) METHOD FOR TYING ROLLS OF FABRIC

(75) Inventors: Robert John Gartland, Youngstown, OH (US); Kenneth Michael Kot, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/453,022

(22) Filed: Jun. 3, 2003

(65) Prior Publication Data

US 2003/0209307 A1 Nov. 13, 2003

Related U.S. Application Data

(62) Division of application No. 09/856,021, filed as application No. PCT/US98/26734 on Dec. 16, 1998, now Pat. No. 6,620,291.

(51) Int. Cl.$^7$ ............................................... B32B 31/16
(52) U.S. Cl. ...................... 156/73.4; 156/73.1; 156/157
(58) Field of Search ........................ 156/64, 73.1, 73.4, 156/157, 308.2, 308.4, 309.6, 358, 580, 580.1, 580.2, 583.1

(56) References Cited

U.S. PATENT DOCUMENTS

| 4,838,964 A | 6/1989 | Thomsen et al. ........... 156/73.1 |
| 4,878,985 A | 11/1989 | Thomsen et al. ........... 156/459 |
| 4,968,369 A | 11/1990 | Darcy et al. ................. 156/217 |
| 5,358,191 A | 10/1994 | Lundell et al. .............. 242/556 |
| 5,988,481 A | 11/1999 | Torihata et al. ............. 228/49.5 |

FOREIGN PATENT DOCUMENTS

| EP | 0015871 | 9/1980 | ........... B29C/17/08 |
| FR | 2193388 | 2/1974 | ........... B65H/21/00 |
| GB | 1529678 | 10/1978 | ........... B65H/19/18 |
| GB | 2260532 | 4/1993 | ........... B65H/19/10 |

*Primary Examiner*—James Sells
(74) *Attorney, Agent, or Firm*—David L. King

(57) ABSTRACT

An apparatus (10) for welding materials has a flat anvil (12) having a width of at least two inches and a length of at least eighteen inches. A welding apparatus (14) having at least one welding head (22) is mounted on a rail (16) which is parallel to said anvil (12). The apparatus (10) may be mobile. In an illustrated embodiment, welding apparatus (14) is an ultrasonic welding unit, and apparatus (10) is used to weld thermoset materials. As illustrated, the method is used to weld thermoset plastic monofilament fabric (34) to provide a continuous method of treating the monofilament fabric (34).

10 Claims, 8 Drawing Sheets

METHOD FOR TYING ROLLS OF FABRIC

This is a Divisional of application Ser. No. 09/856,021, filed May 16, 2001, U.S. Pat. No. 6,620,291, which is a 371 of PCT/US98/26734 filed Dec. 16, 1998.

TECHNICAL FIELD

The invention relates to an apparatus and method for facilitating continuous operation of fabric treating equipment.

BACKGROUND OF THE INVENTION

Fabric treating equipment, e.g., dipping units, often contain complex arrangements of drive and idle rolls, ovens and wind-up, that are used to guide the fabric through the dip unit for adhesive application, drying, heat treating and tensioning operations. The initial threading of a fabric through this complex arrangement is a difficult process, and a time-consuming process, usually in excess of six hours.

Once a fabric has been guided through the equipment, however, continuous operation can be maintained by tying the leading end of a new roll of fabric to the trailing end of a depleted roll of fabric before the end of the depleted roll enters the fabric treating equipment.

Sewing one roll of fabric to the next roll, before the let-off or accumulator, is the fastest means conventionally used to run a dip unit continuously. For continuous operation, it is important that these sewn splices can be made quickly, and do not fail while being processed under tension.

In recent years, nylon monofilament has become an accepted reinforcement material in tires and other composites. Nylon monofilament fabric, especially fabric comprising monofilaments held together with low strength pick (i.e. fill or weft) cords, cannot be sewn to a liner or to another monofilament fabric at the treatment unit. The needles on the sewing machine tend to break when striking the solid nylon monofilaments, thus shutting down the fabric treatment.

A new manufacturing method, and new apparatus are needed that will make possible economical processing of monofilament reinforcing material.

After evaluating numerous methods of attaching one roll of fabric to another, the present inventors decided to try welding, especially ultrasonic welding.

Ultrasonic welding uses the generation of high frequency (e.g. 20 kHz or 40 kHz) mechanical vibrations which are transmitted to a welding horn. This horn applies a force at the surface of the materials to be bonded, and uses intermolecular friction at the interface, caused by the ultrasonic excitation, to melt the material. The force is maintained after the vibration is stopped, and upon cooling a weld is produced.

French patent No. 2,193,388 discloses a process and apparatus for connecting the posterior end of a first band of material to the anterior end of a new band of material on processing equipment. One of the methods described for connecting the two ends together comprises, when the material is a type that can be welded, welding the two ends together.

EP0015871 discloses a method for attaching two pieces of cloth together which comprises the use of ultrasonic welding. Since the use of relatively light weight cloths are the main object of the patent, special techniques wherein a sheet of paper is disposed between the anvil and cloths, and possibly between the cloths and the welding head are described. The paper provides a mechanical barrier and a heat insulative barrier that makes the process suitable for light weight material.

It is an object of the invention to use welding techniques to make economical the processing of monofilament reinforcement for use in composites.

Other objects of the invention will be apparent from the following description and claims.

Disclosure of Invention

A method of continuous operation of a fabric-handling unit for processing a fabric (34) made from thermoset cords or monofilaments comprises the steps of (a) feeding a leading end of a first roll of fabric (34) into a handling unit through the mechanisms of the handling unit, (b) processing the first roll of fabric (34) to a trailing end of the first roll, (c) welding a leading end of a second roll of fabric to the trailing end of the first roll of fabric (34), and (d) continuing the operation of the handling unit by processing the second roll of fabric (34).

Also provided is a method of continuous operation of a fabric-handling unit for processing a fabric (34) made from thermoset cords or monofilaments comprising the steps of (a) feeding a leading end of a first roll of fabric (34) into a handling unit through various nips and rolls of the handling unit, (b) processing the first roll of fabric (34) to a trailing end of the first roll, (c) welding a first fabric tabby (38) comprising thermoset material to the trailing end of the first roll of fabric (34), (d) welding a second fabric tabby (38) comprising thermoset material to a leading end of a second roll of fabric (34), (e) connecting the first tabby (38) to the second tabby (38), and (f) continuing the operation of the handling unit by processing the second roll of fabric (34).

The method of the invention is useful for making a roll of fabric (34) using 6 to 40 e.p.i. of 2,000 to 20,000 dTex thermoset monofilaments (33) in the warp direction, and 1 to 8 e.p.i. pick cords (35) in the weft direction. A tabby (38) made from square woven thermoset cords having a linear density of 660 to 10,000 dTex can be used to tie rolls of fabric together.

The method is conveniently carried out by welding the tabby (38) to the fabric (34) at a weaving loom using at least one row of weld points (40).

The method can be carried out by mounting a welding apparatus (14) on a rail (16) that is attached to a cart (26) so that it is movable relative to fabric which is being welded, and providing a welding apparatus (14) having a single anvil (22) having a flat surface and a length sufficient to weld a full width of fabric (34) without changing a position of the fabric (34) or the anvil (12).

In the illustrated embodiment, the method is carried out by placing the tabby (38) between the fabric and a welding head (22) on a welding apparatus (14).

Also provided is an apparatus for welding comprising a flat anvil (12) which is at least two inches wide and at least eighteen inches long, and a welding apparatus (14). In the illustrated embodiment, the anvil (12) is mounted on a frame (18) and a rail (16) is mounted on frame (18) parallel to anvil (12), and welding apparatus (14) is mounted on rail (16) and is movable on rail (16), and the frame (18) is on a cart (26).

The apparatus (10) including the welding apparatus (14, frame (18) and anvil (12) is mobile.

The welding head (22) is rotatable to provide welds at any angle, and can be raised or lowered.

The apparatus frame (18) has a support bar (24) which is movable to open an end of frame (18), and frame (18) is adapted to surround the fabric from a loom, and cart (26) is adapted to be placed between a loom and a windup stand adapted for rolling fabric onto a spool.

In one embodiment, the apparatus has a light curtain, i.e. light sensors, which surrounds critical portions of the apparatus, and when a light beam to one of the sensors is broken the apparatus shuts down.

The apparatus may also have sensors associated with welding head (22) which provide information to an electronic interface (15) wherein the sensor data is used to modify program parameters for weld head (22) concerning pressure against a sample, residence time for welding, and cool down time.

DETAILED DESCRIPTION OF THE INVENTION

The invention is illustrated using nylon monofilament fabric which is woven at a shuttle loom with an end count of 15 EPI (5.9 e.p.c.) (855 ends total) with a pick density of 2 pick per inch (ppi) (0.8 p.p.c.) of unwaxed 18's gauge rayon cords.

As used herein, "e.p.i." means "ends per inch"; "e.p.c." means "ends per centimeter"; "ppi" means "pick per inch"; and "p.p.c" means "pick per centimeter".

Nylon is a thermoset material, more specifically a thermoplastic material. Thermoset materials, while solid at moderate temperatures, soften or melt and flow at higher temperatures without permanently altering their chemical composition, and accordingly return to their original state when they return to a moderate temperature. Because of this property, thermoset materials can easily be joined by low temperature welding, especially ultrasonic welding.

Nylon is representative of any thermoset material that can be used in the invention.

As used herein, "thermoset" materials includes "thermoplastic" materials.

Although the invention includes a method wherein each thermoset monofilament in a roll of monofilament fabric can be matched up with and welded to a thermoset monofilament in another roll of monofilament fabric, in a manufacturing process where time and efficiency are important, it is preferred that a tabby made of a thermoset material be used as a bridge between two rolls of fabric.

Those skilled in the art will recognize that the invention can be used with any type of loom, and will have applicability to handling filament and cord material in other types of equipment.

Figure 1:
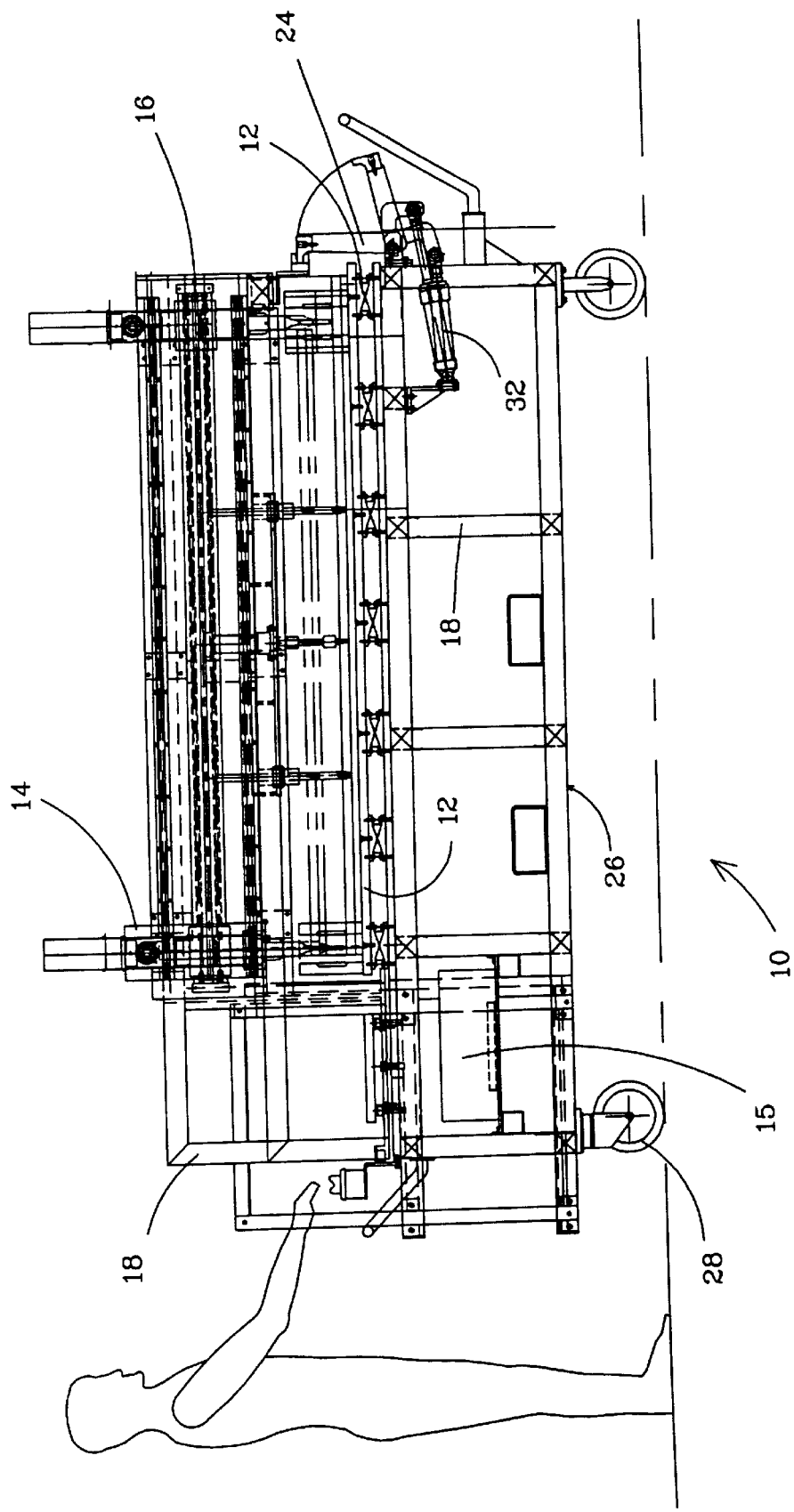
FIG. 1 illustrates a side view of the apparatus of the invention.
Figure 1A:
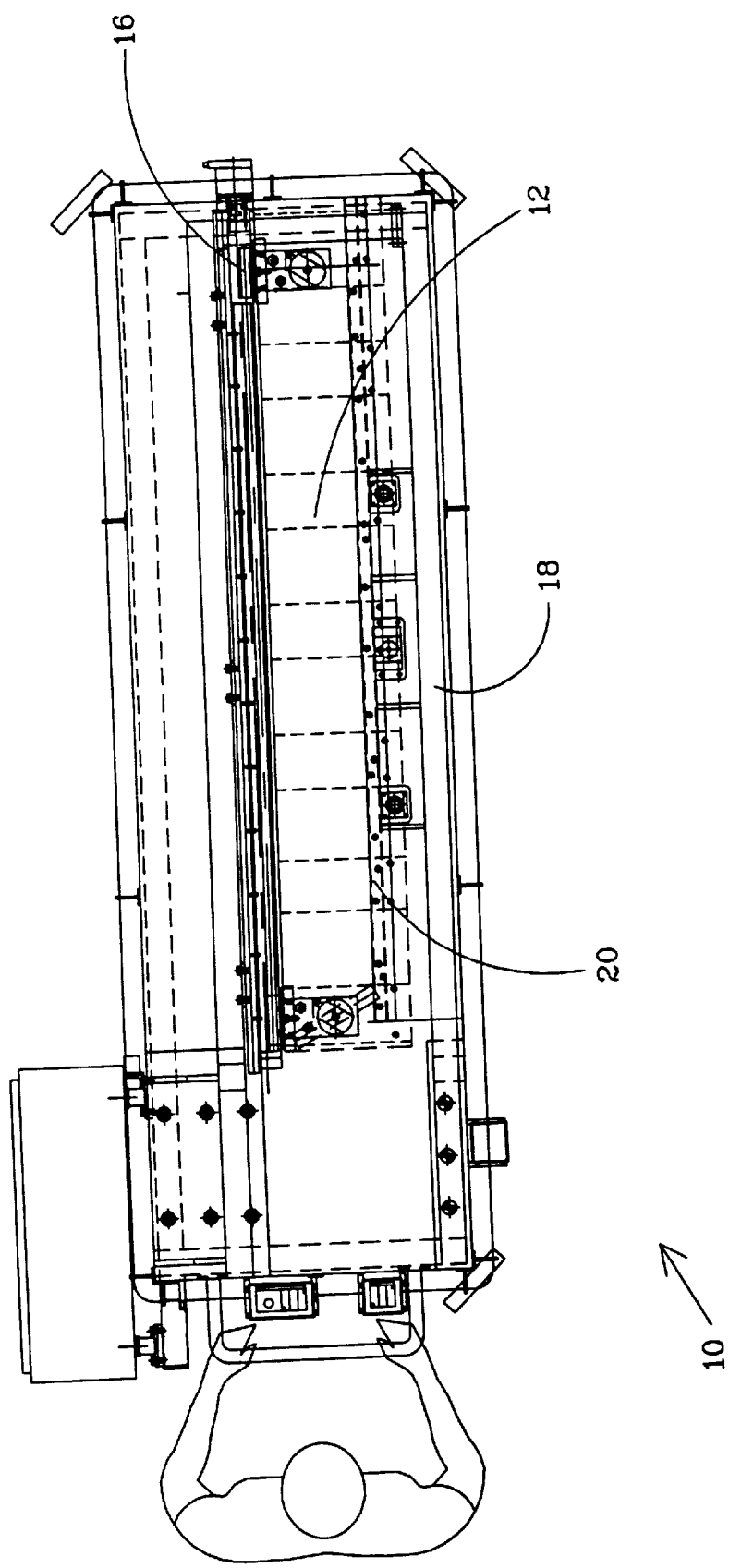
FIG. 1a illustrates a top view of the apparatus of the invention.
Figure 1B:
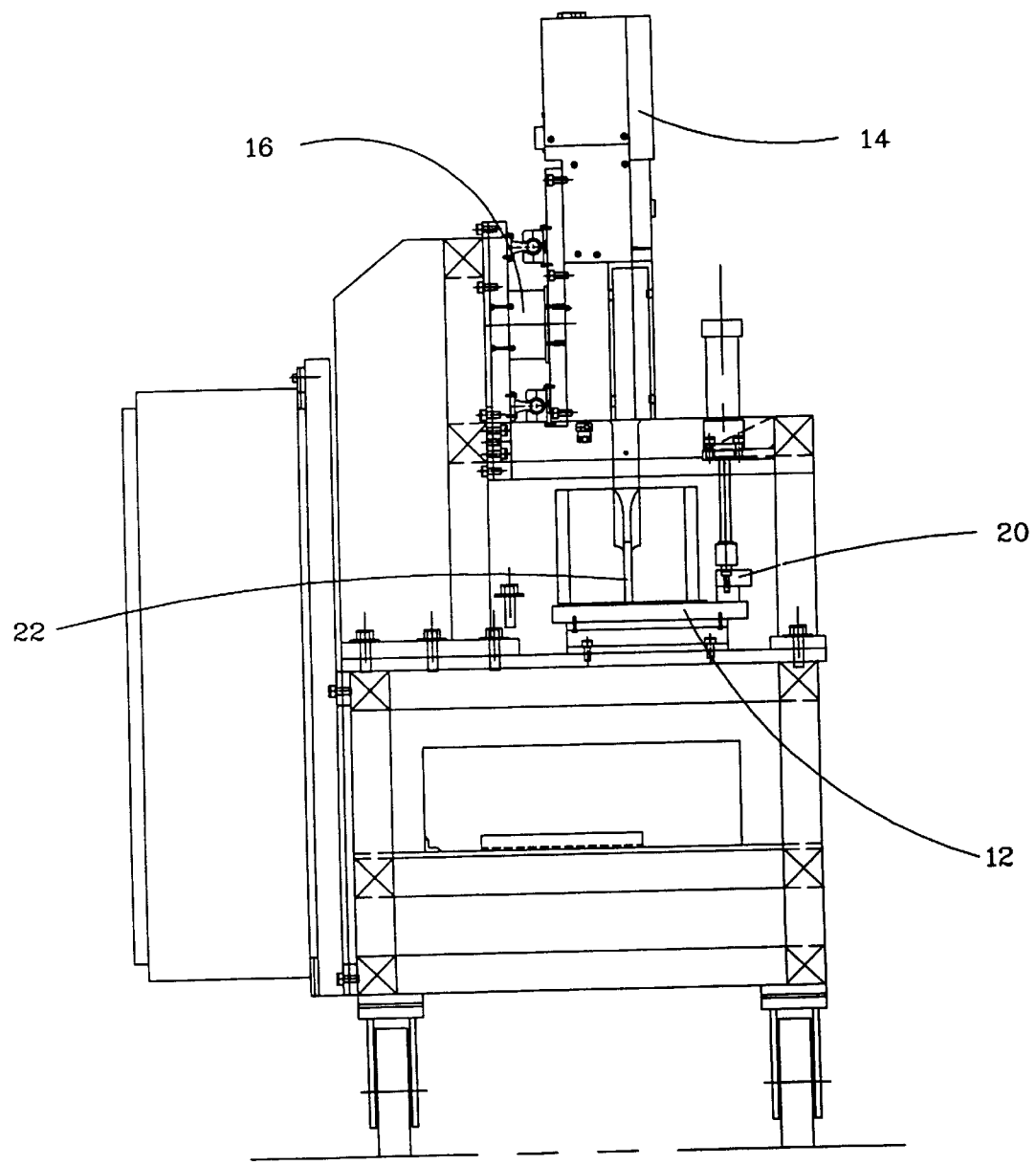
FIG. 1b illustrates an end view of the apparatus of the invention.

With reference now to FIGS. 1, 1a and 1b, an apparatus 10 of the invention is illustrated which comprises a mobile rectangular unit, or cart 26, which has a supporting frame 18, said supporting frame 18 supporting a rail 16 on which is mounted a welding device 14. The cart 26 has attached thereto a plurality of wheels 28 to provide said mobility. Those skilled in the art will recognize that mobility may be provided by other means, or that in another embodiment, the apparatus of the invention can be installed at the loom as a more or less permanent fixture.

The apparatus 10, in an illustrated embodiment wherein mobility is considered an important factor, has a support bracket 24 that opens in order to provide access to a loom. Having an end which opens, and the mobility provided by wheels 28, allows the movement of the apparatus from loom to loom wherein the open end permits the fabric of the loom to fit between anvil 12 and the rail 16 used to support welding unit 14. An air-actuated cylinder 32 is used to open and close support bracket 24, and cylinder 32 may be activated from a control panel on the apparatus.

Since a low temperature weld is desired, it was decided to use an ultrasonic welder in the apparatus and method of the invention. It is believed that other types of welders can be used in the invention, for example a rubber press, their suitability being determined by the nature and physical properties of the material which is to be welded.

Figure 2:
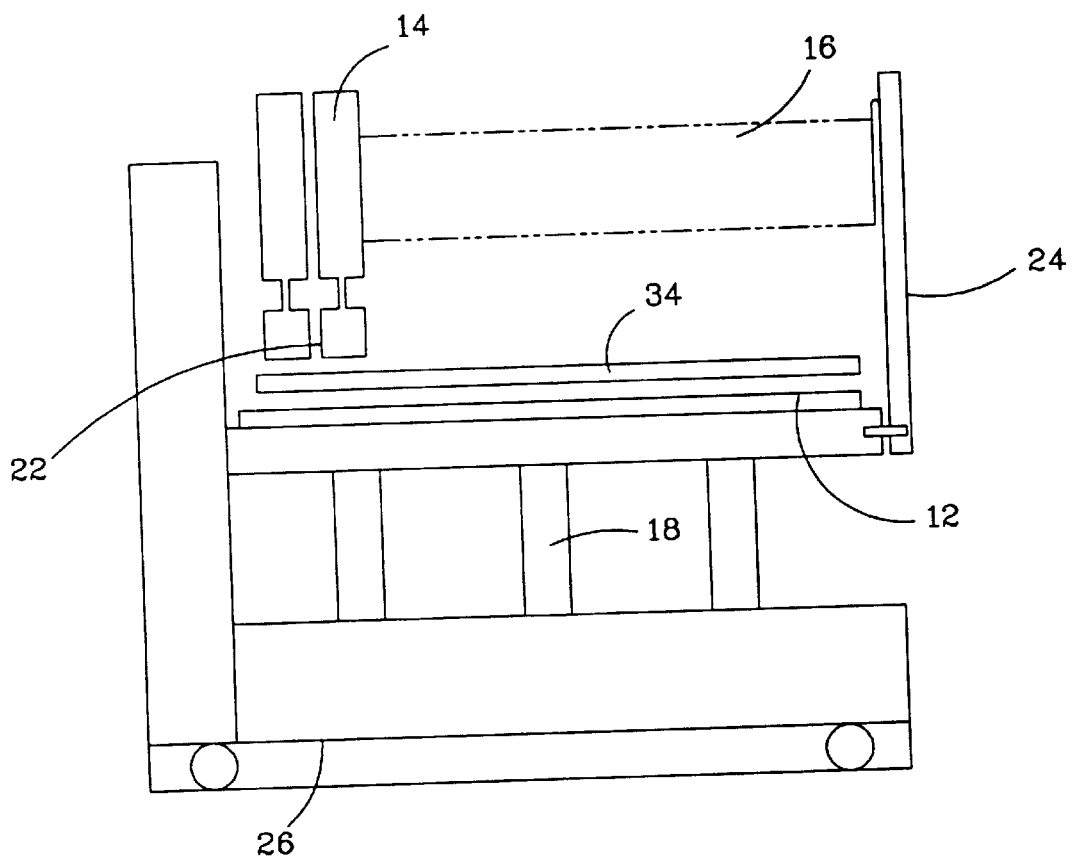
FIG. 2 illustrates a schematic side view of the apparatus of the invention while docked at a loom.
Figure 2A:
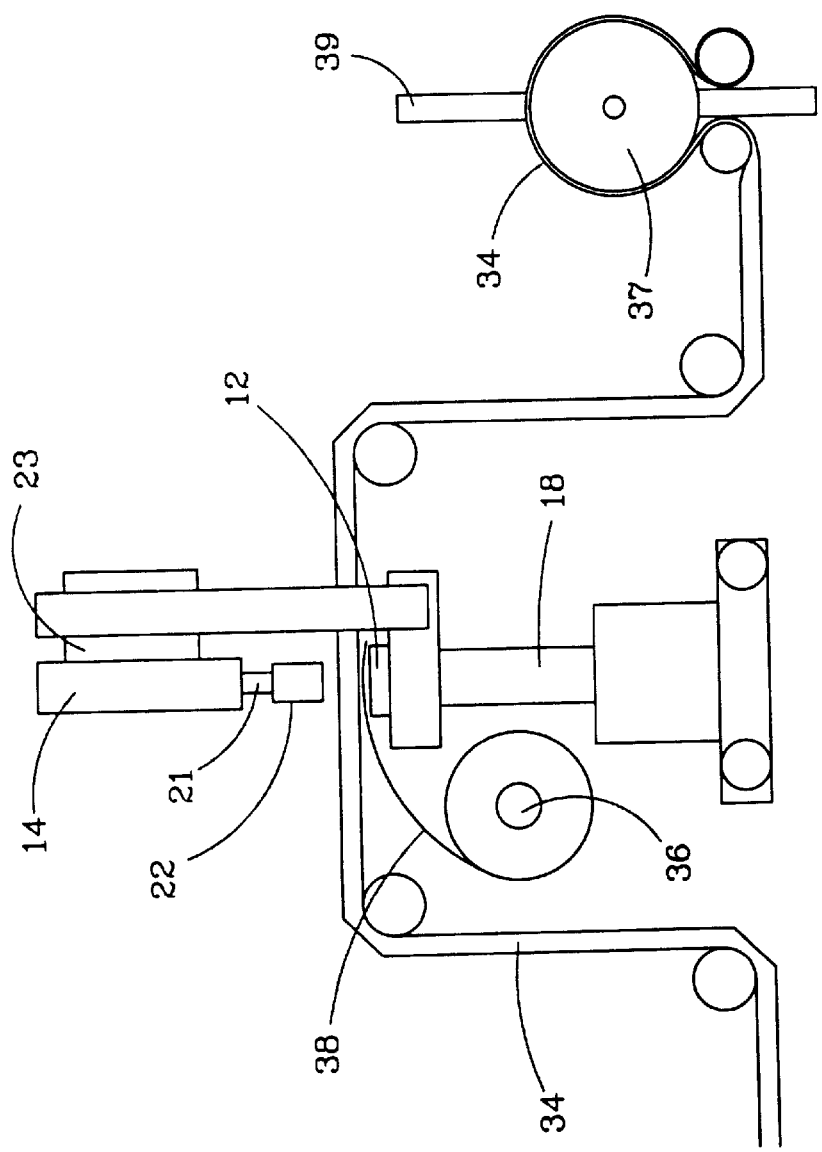
FIG. 2a illustrates a schematic end view of the apparatus docked at a loom.

With reference now to FIGS. 2 and 2a, when apparatus 10 is pushed next to a loom, and support bracket 24 is closed, the apparatus is in surrounding relationship to the fabric from the loom, and with reference specifically to FIG. 2a, fabric 34 passes up and over anvil 12 of the apparatus.

By experimentation, it has been found that anvil 12 may be flat, as opposed to prior art anvils which were shaped to match or complement the shape of the welding head 22. This discovery makes possible the use of an anvil which is at least as long as the weld connection which is to be made, and has a width substantially equal to the length of welding head 22. Since a Weld is made by pressing the material to be welded between the welding head 22 and anvil 12, and creating an ultrasonic vibration, the longer, wider anvil 12 of the invention makes possible welds at any desired angle by changing the angular position of welding head 22 without the need to similarly position an anvil to match said angle and position.

The anvil of the illustrated embodiment of the invention is made of steel, preferably hardened steel, and is 12 inches wide and 70 inches long. Depending on the apparatus in which it is to be used, an anvil of the invention may have a flat surface which is at least two inches wide and at least eighteen inches long. For the purposes illustrated herein, an anvil of the invention may be two to thirty-six inches wide and eighteen to one hundred two inches long.

As is shown in FIG. 2a, a tabby roll may be provided under fabric 34 as part of the loom, or alternatively, installed as part of apparatus 10, wherein tabby 38 may be fed from tabby rod 36 up over anvil 12 and below fabric 34. The inventors herein have found this to be a practical arrangement, although those skilled in the art will recognize that other suitable arrangements may be used wherein the tabby roll 36 is located above fabric 34, and in such an arrangement, fabric 34 will pass over anvil 12, and tabby 36 will be placed between fabric 34 and welding head 22.

It has been found that for some materials, better results in welding may be observed if the tabby Material is placed between the welding head 22 and fabric 34. Such an arrangement has been found to be most suitable for the materials used in the examples herein, under the conditions used herein. Those skilled in the art will recognize that the use of different materials and different conditions may result in a different preferred orientation.

In the illustrated embodiment, a 70 inch wide by 36 inch long tabby 38 (for orientation with the length direction of the fabric 34) is welded to fabric 34 using two sets of welds 40, one at each end of the 36 inch length of tabby 38. The tabby 38 and the monofilament 34 are cut in the middle of tabby 38 (18 inches on each side of the cut), and one part of the tabby 38 is attached to the trailing end of a first roll 37 of fabric 34, and the other part of the tabby is attached to the leading end of a second roll of fabric. The rolls 37 are collected on a wind up stand 39, and can be handled, stored and shipped as needed. When the rolls of fabric are treated, for example in a dip unit, fabric tabbies can be sewn together in the same manner used for conventional fabric.

In alternative embodiments, the tabby may be a plastic sheet of material which can be melted to surround and embed the cords of the fabric. When plastic sheet tabbies are used, the tabbies can be connected by glue or melting at the fabric-handling unit.

A fabric treatment of the type to which the rolls of fabric may be subjected is illustrated; in U.S. Pat. No. 5,407,701, which is incorporated herein by reference.

Figure 3:
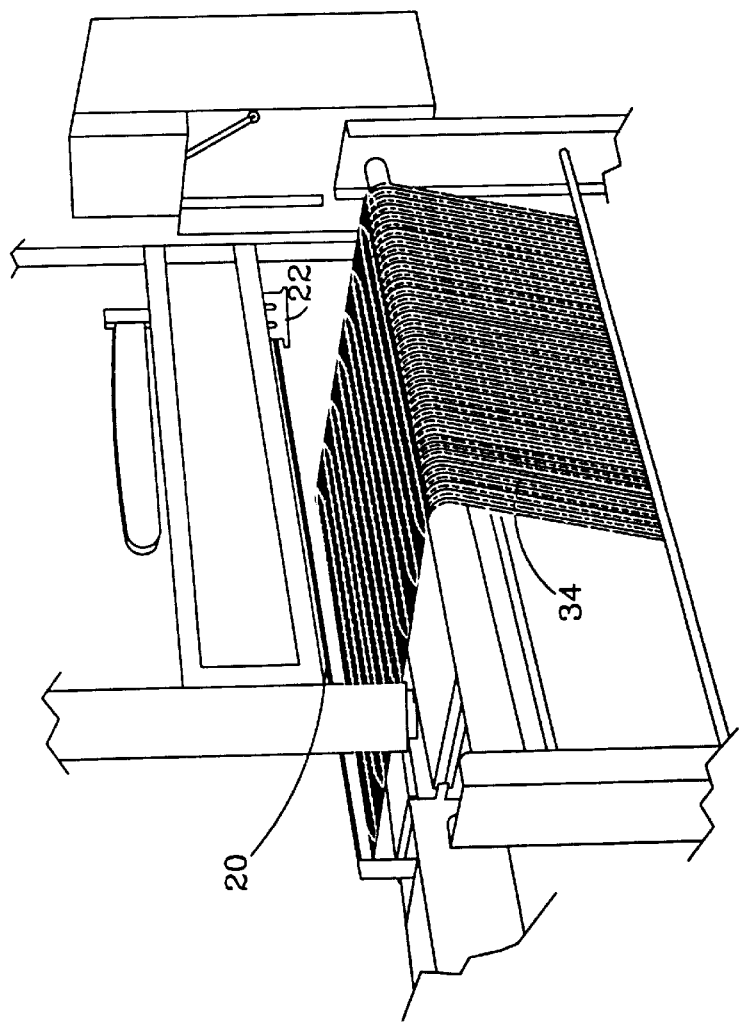
FIG. 3 illustrates a perspective view of the invention with a fabric locking cross bar in an open position.

With reference now to FIG. 3, apparatus 10 is equipped with a lock bar 20 which is maintained in an opened position, as shown, when the apparatus is moved into position, or the fabric is placed on anvil 12 prior to the start of the welding sequence.

Figure 4:
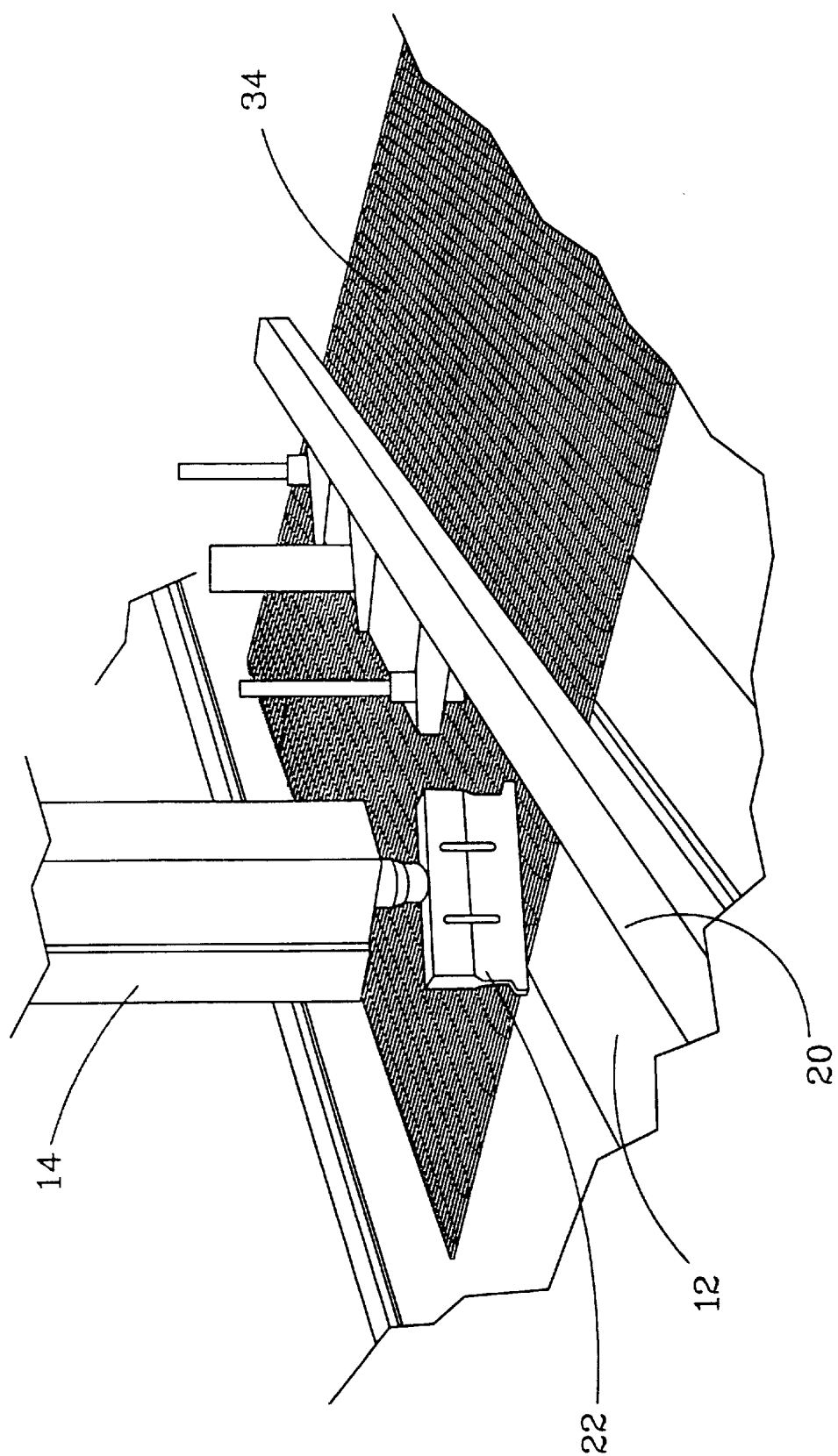
FIG. 4 illustrates a perspective view of the apparatus of the invention with the fabric locking cross bar in a closed position.

With reference now to FIG. 4, when fabric 34 and tabby 38 are in position on anvil 12, lock bar 20 is lowered, holding the fabric and tabby in position against anvil 12. Welding unit 14 is movable on rail 16 so that it can be moved across the full width of the fabric 34 and tabby 38, and the welding unit 14 is designed so that welding head 22 can be rotated at any desired angle relative to the width of fabric 34. The welding head 22 is attached to a rotating means 21 which permits the rotation of welding head 22 to any desired angle. The welding unit has an air cylinder therein which is used to move welding head 22 toward and away from a material which is to be welded.

Welding head 22 is oriented at an angle with respect to the length direction of anvil 12 to provide a diagonal weld when ultrasonic welder 14 is lowered against the anvil 12 and activated. Welding head 22 is sometimes referred to in the prior art as the "horn", especially when referring to ultrasonic welders. Those skilled in the art will recognize that the invention is operable when welding head 22 is oriented at 0° relative to the length direction of anvil 12 when the tensions in the fabric treatment unit are such that a single weld point for each cord or monofilament can be used to provide sufficient strength in the connection between fabric 34 and tabby 38. The inventors provide four weld points for each weld along the length of each monofilament to provide a margin of safety. At least one weld point per monofilament is desired, and for practical purposes, regarding the time involved in creating welds, it is preferred that no more than eight weld points per warp reinforcement be used in a weld.

It has been found to be convenient to make the welds at a 45° angle, about 1-inch apart so that all the welds can be made in one traverse of ultrasonic apparatus 14 across rail 16. This provides four weld points for each monofilament cord. Those skilled in the art will recognize that if a 0° angle is used, and four weld points are desired in a weld, welding head 22 will have to traverse the width of the fabric four times, and the fabric or the weld head will have to be moved each time.

Figure 5:
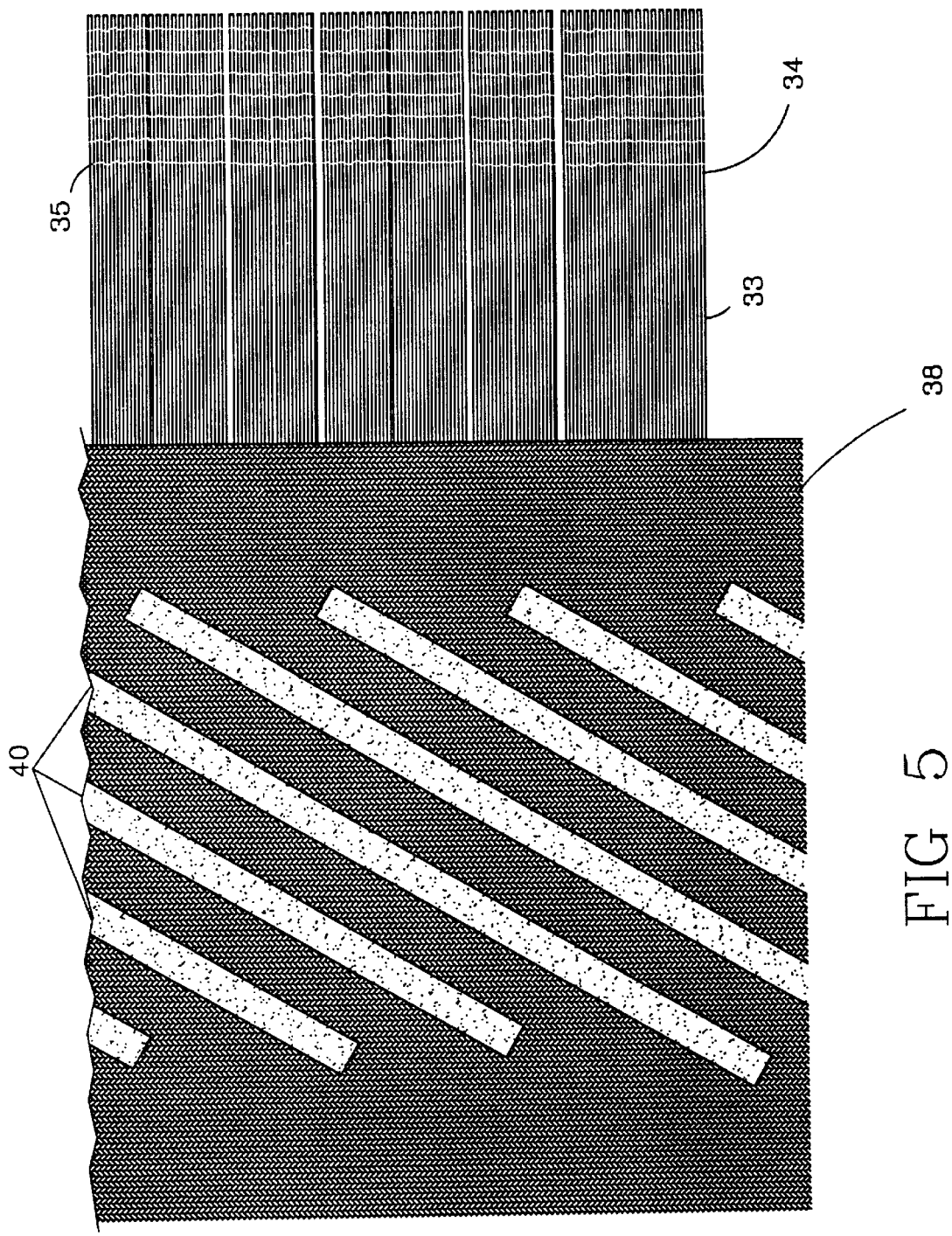
FIG. 5 illustrates monofilament fabric and a tabby with angled weld points.

With reference now to FIG. 5, weld points 40 are illustrated on a tabby 38 which is attached to fabric 34. In the illustrated embodiment, weld points 40 are at an angle of 30 degrees relative to the length direction of anvil 12, and are spaced about two inches apart.

Those skilled in the art will recognize that if time is considered more expensive than welding heads 22 and ultrasonic welding units 14, a plurality of welding units 14 may be spaced across rail 16, and a plurality of welds may be made simultaneously. Also, those skilled in the art will recognize that one solid welding head may be provided that traverses the full length of anvil 12.

Welding may be done automatically under the control of an electronic interface which will set the welding head 22 on anvil 12, set the duration of the ultrasonic vibration, and control the duration of the cool down period after the weld has been made. Since, with extended use, ultrasonic heads 22 have a tendency to heat up, the apparatus may be provided with sensors whereby the temperature of the welding head 22 can be relayed to the electronic interface, and the duration of the weld contact can be modified based on this information, to provide consistent welds throughout a welding operation regardless of the changing physical properties of the welding head 22 during use.

Various safety features may be provided as desired. In the illustrated embodiment, a light curtain, i.e. an invisible infrared light screen, manufactured by Scientific Technologies, is located around the apparatus, whereby if the operator breaks a beam of light with his hand, or any other part of his body, an electrical circuit is broken, and the apparatus stops functioning.

The ultrasonic welding techniques described herein are used to attach a tab fabric to the leading and trailing end of each monofilament fabric roll at the weaving loom. These tabs can be sewn to a liner or to a subsequent monofilament roll at the fabric treatment unit using a standard industrial sewing machine. The monofilament fabric can be pulled through a fabric treatment unit, e.g., a dip unit for adhesive application, heat-treating, and tensioning, without failure of the splices.

The tabby reinforcement used in the illustrated embodiment is a Nylon 6,6 dipped square woven conveyor belt fabric. The ultrasonic welding press is positioned between the weaving loom and the windup stand.

The ultrasonic welder on the top rail is moved by a stepper motor that is controlled by an electronic interface. Once the monofilament and fabric are secured in position, the welder traverses across the fabric in programmed distance and time increments, and ultrasonically welds them together.

The press was manufactured by T A Systems Inc. The ultrasonic welder was purchased from Branson Ultrasonic Corporation. The welder is a 3000 watts unit model 930DA using a 9-inch long, ½ inch wide horn for making the welds. It has been found that better strength results are achieved when one row of diagonal welds closely spaced is used, as compared to four rows of horizontal welds.

The invention is further illustrated with reference to the following examples.

EXAMPLE 1

Preliminary testing was done to characterize weld strength on a number of fabric constructions.

All the welds were tested under simulated dipping conditions by several procedures such as shear force, peel force, elevated temperature, and dynamic flexing.

The type and construction of the square woven fabric was selected based on strength, flexibility, and adhesion. Nylon 6,6 square woven fabric yielded excellent adhesion.

In addition dipped and greige fabric were compared against each other. It was found that the weld strength of dipped square woven fabric is less than the weld strength of the greige fabric. However, the heat-treated adhesive coating does optimize the adhesion and shrinkage properties of the fabric, and an adhesive coated fabric has a very stable interface during welding, which is important. Accordingly, a water dipped, heat treated greige fabric was considered the optimal tabby for this example.

Many splicing techniques were evaluated in order to establish the best technology for attaching the nylon monofilament fabric to a square woven tabby that could be sewn to a liner or itself. In addition to evaluating the splices, laboratory testing was conducted to assess monofilament fabric/tabby attachment performance under conditions similar to processing in a mill dip unit. These tests include: 1) Room Temperature shear force measurements (>350 lbs/inch) 2) Room Temperature peel test (>60 lbs/inch) 3) Constant shear force at elevated temperatures time to failure (400 F, 75 lbs load>3 minutes) 4) Weld brittleness and dynamic testing (21.5 in dia spindle, 75 lbs load—passed 750 cycles at 2.3 minutes).

Conditions were also assessed for horn design, weld time and horn pressure.

The fabric was selected to be stiff enough for stability, but suitable for sewing using an industrial sewing machine.

It was established through testing and trials that it was best to have the dipped square woven fabric against the welding horn and the nylon monofilament fabric against the anvil fixture. It was also determined that a flat fixed anvil worked well in place of a matching bar underneath the horn.

The results of the survey for tabby fabrics are illustrated in the following table.

TABLE I

| Type | A | B | C | D | E |
|---|---|---|---|---|---|
| Matl Const | Nylon6,6 | Nylon6,6 | Nylon6,6 | Nylon6, 6 | Nylon6, 6 |
| Warp | 840/2 | 1260/2 | 1680/2 | 1260/2 | 840/2/3 |
| TPI | 4 | 3 | 3 | 3 | 6/3 |
| (TPC) | (1.6) | (1.2) | (1.2) | (1.2) | (2.4/1.2) |
| EPI | 47.5 | 47.5 | 51.0 | 47.0 | 20.0 |
| (EPC) | (18.7) | (18.7) | (20.1) | (18.5) | (7.9) |
| Fill | 840/2 | 1260/3 | 1260/4 | 1260/3 | Thermax ® |
| TPI | 19 | 12 | 13 | 11.7 | 11 |
| (TPC) | (7.5) | (4.7) | (5.1) | (4.6) | (4.3) |
| EPI | 47.5 | 47.5 | 51 | 47 | 6 |
| (EPC) warp | (18.7) | (18.7) | (20.1) | (18.5) | (2.4) |
| Tens Str (PSI) (KSC) | 1099 (77.3) | 935 (65.8) | 1211 (85.2) | 935 (65.8) | 1150 (80.9) | where TPI is turns per inch and TPC is turns per centimeter, EPI is ends per inch and EPC is ends per centimeter, PSI is pounds per square inch and KSC is kilograms per square centimeter. Thermaxx cord is a hollow dacron/polyester produced by DuPont.

EXAMPLE 2

The tabby reinforcement used was a Nylon 6,6 dipped square woven conveyor belt fabric. For all of the development trials, a Branson 2000 watts unit, model 9201W, was used. A 6-inch (15.2 cm) long, by hi inch (1.27 cm) wide horn was used for making the splices at the lead and trail ends of the square woven fabric. Four rows of splices were used in which 6-inch (15.2 cm) welds were staggered across the width of the web. The welding was done off line and involved a significant amount of handling to make the four rows of welds.

EXAMPLE 3

Through testing, the following procedure was developed to provide acceptable welds for the conditions of manufacture.

TABLE II

PROCEDURE FOR WELDING SQUARE WOVEN TABBY TO MONOFILAMENT FABRIC
The weld head used was a Branson 3000 watts, Model 930DA, using a 9-inch by ½-inch horn.

1. Cut Tabby (square woven fabric having a width of 70 inches) to a length of 36 inches.
2. Position tabby over monofilament, centering the tabby over the fabric. This assembly must be lined-up under the ultrasonic welder head
   NEED TO WELD BOTH ENDS OF TABBY TO THE MONOFILAMENT FABRIC.
3. Welding Conditions for the Nylon Monofilament
   Weld time, sec                1.5
   Hold time, sec                1.0
   Horn pressure, psi            45
   Weld trigger, #               10
4. The welding unit needs to be in the home position before the automated welding sequence can begin.
5. Welding sequence.
   A. Hand activation of cycle
   B. Engage cloth clamp (automatic)
   C. Lower welding head (automatic)
   D. Welding two materials together (automatic)
   E. Raise welding head (automatic)
   F. Index welding unit 2.0 inches over (automatic)
   G. REPEAT steps C–F until end limit switch engaged (automatic)
   H. Welding head returns to home position (automatic)
   I. Cloth clamp is opened (automatic)
6. Fabric weaving is continued to position the composite tabby to the next welding cycle if it is needed (repeat steps 4&5)
7. Transfer and inspect, each edge of the monofilament fabric must be attached to the tabby square woven fabric.
7a. Operate loom until tabby is on windup roll.
8. Cut monofilament between the welds on the square woven fabric. Cut the Square woven fabric in the center to create two tabs, one tab will be the end of the roll, the other will be the start of the next roll.
9. Attach leading end of new roll with tabby to the windup shell.

Weld orientation of 30 degrees relative to the warp direction of the monofilament was used with a Horn travel distance 2.0 inches. Typical weld strength obtained was 465 lbs/inch. Pull tests indicate that excellent tensile strength is obtained using the diagonal welds.

The objective of the welding arrangement is to obtain one row of diagonal welds closely spaced in which there are about 4 welds on each monofilament in the warp direction. There were no problems with the splicing operation itself in traversing across the unit and returning to home position. On the most accessible side of the welder, an electric curtain protects the unit and disables the weld cycle when the curtain is interrupted.

EXAMPLE 4

The following illustrates the specifications adopted for the use of the apparatus in a factory environment:
1. Maximum fabric width of material is 70 inches.
2. Utilities available: Compressed air: 90 psi maximum pressure. Electrical: 115 to 575 volts.
3. The splice shall have the minimum strength of 100 pounds per inch width of fabric when tested at a room temperature. The monofilament end count will be from 14 to 16 ends per inch and the strength of each monofilament is about 70 pounds. The square woven nylon tabby's strength per inch width is greater than the monofilament's strength. More than one splice may be used to meet the inch strength requirements.

4. Splice time and splice pressure shall be adjustable. The maximum cycle time of the splice(s) which meet the above strength criteria is 10 minutes.

5. The unit shall be mobile to accommodate moving from loom to loom. The loom will have a four (4) feet wide space for the unit. Any type of power attachment required (air, electric, etc.) on an integrated design is acceptable but must also have a quick disconnect system.

6. The unit shall have one end open so that it can be moved into position over the stationary horizontal fabric web. If this end needs to be supported during the splicing operation. the system should include a support bracket that locks it into position and has safety interlocks so that the unit's power system is disabled if not closed.

7. The monofilament will be under tension. A clamping device to hold the tabby during the splicing operation should be installed.

What is claimed is:

1. A method of continuous operation of a fabric-treating unit for processing a fabric made having thermoset cords or monofilaments comprising the steps of
    (a) feeding a leading end of a first roll of fabric into a fabric treating unit.
    (b) processing said first roll of fabric to a trailing end of said first roll, characterized by
    (c) providing a welding apparatus having a single anvil having a flat surface and a length sufficient to weld a full width of fabric without changing a position of the fabric or said anvil,
    (d) welding a first tabby to said trailing end of said first roll of fabric
    (e) welding a second tabby to a leading end of a second roll of fabric
    (f) connecting said first tabby to said second tabby, and
    (g) continuing the operation of said fabric treating unit by processing said second roll of fabric.

2. The method of claim 1 comprising the further steps of
    (a) making said roll of fabric using 6 to 40 e.p.i. (2.4 to 15.7 e.p.c.) of 2,000 to 20,000 dTex thermoset monofilaments in the warp direction, and 1 to 8 e.p.i. (0.4 to 3.15 e.p.c.) pick cords in the weft direction, and
    (b) making said tabby from square woven thermoset cords having a linear density of 660 to 10,000 dTex.

3. The method of claim 1 comprising the further step of selecting the material for said thermoset cords or monofilaments, and the material for said tabbly to be nylon.

4. The method of claim 1 comprising the further step of making said first roll of fabric using 10 to 20 e.p.i. (3.9 to 7.9 e.p.c.) cords or monofilaments in the warp direction and 1 to 3 e.p.i. (0.4 to 1.2 e.p.c.) pick cords in the weft direction.

5. The method of claim 1 comprising the further step of welding said tabby to said fabric at a weaving loom.

6. The method of claim 1 comprising the further step of making said tabby from nylon 6.6 cords woven into a fabric.

7. The method of claim 1 comprising the further step of ultrasonically welding a tabby to a fabric roll using at least one row of welds.

8. The method of claim 1 comprising the further steps of placing welding apparatus on a cart so that the apparatus can be moved from loom to loom.

9. The method of claim 1 comprising the further step of mounting a welding apparatus on a rail on cart so that it is movable relative to fabric which is being Welded.

10. The method of claim 1 comprising the further step of placing said tabby between said fabric and a welding head on a welding apparatus.

* * * * *